US012095268B2

United States Patent
Cai et al.

(10) Patent No.: US 12,095,268 B2
(45) Date of Patent: Sep. 17, 2024

(54) DIRECTLY-CONNECTED HIGH-VOLTAGE BATTERY ENERGY STORAGE SYSTEM (BESS) AND CONTROL METHOD THEREOF

(71) Applicants: SHANGHAI JIAO TONG UNIVERSITY, Shanghai (CN); SHENZHEN HOPEWIND ELECTRIC CO., LTD, Shenzhen (CN)

(72) Inventors: Xu Cai, Shanghai (CN); Xiqi Wu, Shanghai (CN); Dangsheng Zhou, Shanghai (CN); Rui Li, Shanghai (CN); Chang Liu, Shanghai (CN); Xiao Huang, Shanghai (CN); Yihang Lyu, Shanghai (CN); Zihao Hu, Shanghai (CN)

(73) Assignees: SHANGHAI JIAO TONG UNIVERSITY, Shanghai (CN); SHENZHEN HOPEWIND ELECTRIC CO., LTD, Shenzhen (CN)

( * ) Notice: Subject to any disclaimer, the term of this patent is extended or adjusted under 35 U.S.C. 154(b) by 92 days.

(21) Appl. No.: 18/099,276

(22) Filed: Jan. 20, 2023

(65) Prior Publication Data

US 2023/0238803 A1 Jul. 27, 2023

(30) Foreign Application Priority Data

Jan. 21, 2022 (CN) .......................... 202210073651.8
Feb. 10, 2022 (CN) .......................... 202210126545.1

(51) Int. Cl.
*H02J 3/32* (2006.01)
*H02J 7/00* (2006.01)
*H02J 7/34* (2006.01)

(52) U.S. Cl.
CPC .............. *H02J 3/32* (2013.01); *H02J 7/0014* (2013.01); *H02J 7/0048* (2020.01); *H02J 7/34* (2013.01); *H02J 2207/20* (2020.01)

(58) Field of Classification Search
CPC .......... H02J 3/32; H02J 7/0048; H02J 7/0014; H02J 7/34; H02J 2207/20
See application file for complete search history.

(56) References Cited

U.S. PATENT DOCUMENTS 10,116,159 B1  10/2018  Li et al.
2020/0014306 A1  1/2020  Riar et al.
(Continued)

FOREIGN PATENT DOCUMENTS

CN  102916440 A  2/2013
CN  108306320 A  7/2018
(Continued)

OTHER PUBLICATIONS

Chang Liu, et al., Compound Balancing Control Strategy of SOC for Battery Energy Storage System Based on Cascaded H-bridge Converter, Automation of Electric Power Systems, 2019, pp. 68-77, vol. 43 No. 10.
(Continued)

*Primary Examiner* — Jared Fureman
*Assistant Examiner* — Duc M Pham
(74) *Attorney, Agent, or Firm* — Bayramoglu Law Offices LLC

(57) ABSTRACT

A directly-connected high-voltage battery energy storage system (BESS) and a control method thereof are provided. The directly-connected high-voltage BESS includes a battery module, a direct current (DC)/DC converter, a DC bus capacitor, a DC/alternating current (AC) converter, and a grid-side filter inductor. A plurality of battery modules is connected in series to form a battery cluster. The battery cluster is connected in series to the DC/DC converter to form a battery branch, and a plurality of battery branches is connected in parallel to form a battery stack. The battery stack is connected in parallel to the DC bus capacitor and
(Continued)

then connected to a DC port of the DC/AC converter to form a battery energy storage submodule. AC ports of a plurality of battery energy storage submodules are connected in series to form a chain-type phase converter.

14 Claims, 15 Drawing Sheets

(56) References Cited

U.S. PATENT DOCUMENTS

2023/0420956 A1* 12/2023 Wu ..................... H02J 7/0019
2024/0014677 A1* 1/2024 Wu ..................... G01R 31/387

FOREIGN PATENT DOCUMENTS

| CN | 109245123 A | 1/2019 |
| CN | 110350564 A | 10/2019 |
| CN | 111092449 A | 5/2020 |
| CN | 111786401 A | 10/2020 |
| CN | 113572248 A | 10/2021 |

OTHER PUBLICATIONS

Xu Cai, et al., Power Conversion Technology Connected to High Voltage Grid Without Transformer in Battery Storage Energy System and Evaluation of the First Demonstration Application in World, Chinese Journal of Electrical Engineering, 2020.

* cited by examiner

DIRECTLY-CONNECTED HIGH-VOLTAGE BATTERY ENERGY STORAGE SYSTEM (BESS) AND CONTROL METHOD THEREOF

CROSS REFERENCE TO THE RELATED APPLICATIONS

This application is based upon and claims priority to Chinese Patent Application No. 202210073651.8, filed on Jan. 21, 2022; and Chinese Patent Application No. 202210126545.1, filed on Feb. 10, 2022, the entire contents of which are incorporated herein by reference.

TECHNICAL FIELD

The present disclosure relates to the technical field of electrical automatic equipment, specifically, to a directly-connected high-voltage battery energy storage system (BESS) and a control method thereof, and more specifically, to a capacity expansion and frequency doubling current suppression method for a directly-connected high-voltage energy storage system (ESS).

BACKGROUND

A large-capacity battery energy storage technology is conducive to improving installed capacities of wind and photovoltaic power sources and promoting the transformation of an energy structure to help achieve peak carbon dioxide emissions and carbon neutrality. Compared with a traditional ESS, a directly-connected high-voltage BESS achieves a large capacity and meets requirements of high efficiency, high reliability, economical efficiency, and security. Only a small number of parallel directly-connected high-voltage BESS equipment is required to form a large-scale energy storage station. With a simple structure, a simple control policy, and a high response speed, the energy storage station can meet a requirement of a 100 MW-level ESS and does not easily cause a system stability problem.

The directly-connected high-voltage BESS based on a cascaded H-bridge converter is highly modular. A capacity of a single directly-connected high-voltage BESS equipment is large but theoretically does not exceed 100 MW under existing technical conditions. However, large-scale wind and photovoltaic power sources are connected to a grid at a high proportion, which enables a grid-side battery energy storage station to enter 100 MW-level capacity and move toward a GW-level capacity, thus requiring higher requirements for safety, operating efficiency, and a dynamic characteristic of the battery energy storage station.

The power and capacity of the single directly-connected high-voltage BESS can be further improved by using the following three methods or any combination thereof, to achieve GW-level energy storage: 1) increasing the number of submodules in each phase of the cascaded H-bridge converter to increase the output voltage of the directly-connected high-voltage BESS; 2) increasing the number of parallel battery clusters of each submodule of the cascaded H-bridge converter to increase the output current of the directly-connected high-voltage BESS; and 3) increasing the rate or ampere hour of the battery of each submodule of the cascaded H-bridge converter to increase the output current of the directly-connected high-voltage BESS. However, the first method increases the burden of the control system. The control system needs to process more modulated signals, protection signals, and battery state information. A communication delay limits the bandwidth of the control system, thereby affecting the dynamic response and the output characteristic of the converter. In the second method, states of charge (SOCs) of the parallel battery clusters cannot be balanced, and there is a circulating current between the battery clusters, which reduces the efficiency of the battery cluster and easily leads to overcharging, over-discharging, and other safety problems of the battery. The third method requires a customized battery cell with a larger capacity or a higher discharge rate/charge rate, which is costly.

In addition, the traditional directly-connected high-voltage BESS based on the cascaded H-bridge converter needs to add a capacitor and an inductor on a direct current (DC) side of an H-bridge submodule to form a passive filter to suppress an impact of a frequency doubling current flowing into the battery on the service life of the battery. However, the filter capacitor and the filter inductor bear a double-power frequency current and voltage ripple, which requires large inductance and capacitance values, and the passive filter is also bulky and costly.

In the prior art, the following methods have been proposed to resolve the above problems of the directly-connected high-voltage BESS based on the cascaded H-bridge converter:

The patent document CN111786401A (application No.: 202010818900.2) discloses a high-voltage 100 MW BESS and an optimization and control method thereof. The high-voltage 100 MW BESS includes a polyphase structure, and each phase of the polyphase structure is divided into a plurality of layers from top to bottom. Each of the layers is provided therein with a battery module, and the battery module is connected to a DC terminal of an H-bridge converter. The H-bridge converter on each phase is cascaded. This patent adopts the polyphase structure. A plurality of phases is connected in parallel to form a 100 MW battery energy storage station. The 100 MW battery energy storage station has a simple structure, easy coordination and control, and a control loop model with a low coupling level, and does not easily cause a system stability problem. However, the polyphase structure needs to increase phase splitting transformers, and more submodules need to be controlled in polyphase control, which requires a higher communication speed and data processing capacity for the control system.

The patent document CN109245123A (application No.: 201811317645.2) discloses a virtual synchronization control system and method for multi-machine parallel connection of a cascaded ESS. First, active power is calculated based on a three-phase voltage of each cascaded energy storage converter, a given active power command of the grid, and the current power of a thermoelectric generating set, and is superposed with an active power variation to obtain a given total active power value. Then a given active/reactive current value is calculated. After that, an average modulated voltage of a power conversion unit is superposed with a balanced-controlled voltage component to obtain a total modulated voltage. Finally, a pulse driving signal of each power device is calculated. This patent enables a plurality of cascaded energy storage converters to be directly connected in parallel to a low-voltage side of a high-voltage auxiliary transformer of a thermal power plant in a high-voltage manner for joint frequency modulation with the thermoelectric generating set, but the power and capacity of the single directly-connected high-voltage BESS are still limited.

The patent document CN113572248A (application No.: 202110740928.3) discloses an energy storage submodule and a directly-connected high-voltage large-capacity ESS composed of the energy storage submodule. The energy storage submodule includes a modular multilevel converter (MMC) unit and a plurality of adjustable DC energy storage units. Each of the adjustable DC energy storage units includes a DC switch, an energy storage medium unit, and a bidirectional DC/DC converter unit. One terminal of the bidirectional DC/DC converter unit is connected to a cascaded structure of the DC switch and the energy storage medium unit, and the other terminal is connected to a DC terminal of the MMC unit. The energy storage medium unit is composed of a plurality of energy storage media that is identical and connected in series. The directly-connected high-voltage large-capacity ESS includes various phase branches composed of inductors and many energy storage submodules.

SUMMARY

To overcome the shortcomings in the prior art, the present disclosure is intended to provide a directly-connected high-voltage BESS and a control method thereof.

The present disclosure provides a directly-connected high-voltage BESS including a battery module, a DC/DC converter, a DC bus capacitor, a DC/alternating current (AC) converter, and a grid-side filter inductor.

A plurality of battery modules is connected in series to form a battery cluster. The battery cluster is connected in series to the DC/DC converter to form a battery branch, and a plurality of battery branches is connected in parallel to form a battery stack.

The battery stack is connected in parallel to the DC bus capacitor and to a DC port of the DC/AC converter to form a battery energy storage submodule.

AC ports of a plurality of battery energy storage submodules are connected in series to form a chain-type phase converter. One terminal of each of the three chain-type phase converters is connected to form a neutral point, and the other terminal of each of the three chain-type phase converters is connected to an AC grid through the grid-side filter inductors of the three chain-type phase converters to form a three-phase chain-type BESS.

Preferably, in each battery stack, DC ports of DC/DC converters in the battery branches are connected in parallel to a common bus capacitor, and the DC/DC converters in the battery branches together constitute a converter for coordinated current control between battery clusters.

Preferably, the converter for the coordinated current control between the battery clusters includes the common bus capacitor, M H-bridge circuits, and 2M filter inductors.

An $m^{th}$ H-bridge circuit in the H-bridge circuits includes four switch transistors $S_{m1}$ to $S_{m4}$; $S_{m1}$ and $S_{m2}$ form a first bridge arm of the $m^{th}$ H-bridge circuit; $S_{m3}$ and $S_{m4}$ form a second bridge arm of the $m^{th}$ H-bridge circuit.

The first bridge arm and the second bridge arm of the $m^{th}$ H-bridge circuit are separately connected to the battery branch by using the filter inductor.

The present disclosure provides a three-level battery SOC equilibrium control method, where the above directly-connected high-voltage BESS is used to perform the following steps:

battery SOC equilibrium control between battery clusters: obtaining a correction amount of charging and discharging current of each battery cluster based on the difference between battery SOCs of the battery clusters and controlling the charging and discharging current of each battery cluster based on the correction amount to achieve battery SOC equilibrium between the battery clusters;

battery SOC equilibrium control between battery energy storage submodules: sorting battery SOCs of the battery energy storage submodules and determining the required submodules based on the current direction of a subordinate phase and the quantity of submodules required for modulation to achieve battery SOC equilibrium between the battery energy storage submodules; and battery SOC equilibrium control between phases: obtaining a correction amount of charging and discharging power of a chain-type converter of each phase based on the difference between battery SOCs of the phases and calculating a to-be-injected zero-sequence voltage based on the correction amount to achieve battery SOC equilibrium between the phases.

Preferably, the battery SOC equilibrium control between the battery clusters is implemented in the following manner: collecting a battery $SOC_{jnm}$ of each cluster in an $n^{th}$ battery energy storage submodule in a chain-type converter of a phase j, and calculating an average battery $SOC_{jn}$ of each cluster, where the average battery $SOC_{jn}$ of each cluster is a battery SOC of the $n^{th}$ battery energy storage submodule; after performing a subtraction on the battery SOC of each cluster and its average value, obtaining the correction amount of the charging and discharging current of each battery cluster based on a proportionality factor of the battery SOC equilibrium between the clusters, namely, $\Delta i^*_{jnm}=\beta\Delta SOC_{jnm}$, where $\Delta SOC_{jnm}$ represents a difference between a battery $SOC_{jnm}$ of an $m^{th}$ battery cluster and the battery $SOC_{jn}$, of the $n^{th}$ battery energy storage submodule, $\beta$ represents the proportionality factor of the battery SOC equilibrium between the clusters, and $\Delta i^*_{jnm}$ represents a correction amount of a battery charging and discharging current of the $m^{th}$ battery cluster; and transferring the correction amount of the charging and discharging current of each battery cluster to a controller of the converter for the coordinated current control between the battery clusters to calculate a given current of each cluster.

Preferably, the battery SOC equilibrium control between the battery energy storage submodules is implemented in the following manner: collecting a battery $SOC_{jn}$ of each battery energy storage submodule of a phase j, sorting the battery SOC of each battery energy storage submodule of the phase j, and determining a driving signal of each battery energy storage submodule based on a current direction of the phase j and the quantity of submodules required for latest level modulation.

Preferably, the battery SOC equilibrium control between the phases is implemented in the following manner: collecting a battery $SOC_{jn}$ of each battery energy storage submodule of a phase j, and calculating an average battery $SOC_j$ of the battery energy storage submodule, where the average battery $SOC_j$ of the battery energy storage submodule is a battery SOC of a chain-type converter of phase j; calculating an average battery SOC of a three-phase chain-type converter, where the average battery SOC of the three-phase chain-type converter is a battery SOC of the three-phase chain-type BESS; after performing a subtraction on the SOC of the chain-type converter of each phase and its average value, obtaining the correction amount of the charging and discharging power of the chain-type converter of each phase based on a proportionality factor of the battery SOC equilibrium between the phases; and then calculating an amplitude and a phase of the to-be-injected zero-sequence voltage based on the correction amount of the charging and discharging power of the chain-type converter of each phase.

The present disclosure provides a method for coordinated current control and frequency doubling current suppression between clusters, where the above directly-connected high-voltage BESS is used to perform the following steps:

performing summation on an output value of a proportional integral (PI) module for outputting a DC component control of a voltage and an output value of a proportional resonant (PR) module for outputting an AC component control of the voltage to obtain a modulated wave of the DC/DC converter, generating a corresponding pulse width modulation (PWM) signal based on the modulated wave of the DC/DC converter, and controlling the DC/DC converter based on the generated PWM signal.

Preferably, the output value of the PI module for outputting the DC component control of the voltage is obtained in the following manner: calculating a given current value of each battery cluster under objective optimization based on SOC, temperature, impedance, and a total current of the battery cluster, and taking the given current value as a positive input of the PI module for outputting the DC component control of the voltage;

taking a given voltage value of the common bus capacitor as a positive input of a PI module of the voltage loop of common bus capacitor, and taking a sampled voltage value of the common bus capacitor as a negative input of the PI module of the voltage loop of common bus capacitor to obtain an output value of the PI module of the voltage loop of common bus capacitor;

making the current of each battery cluster pass through a symbolic function module, multiplying an output value of the symbolic function module by the output value of the PI module of the voltage loop of common bus capacitor, and taking a product as a negative input of the PI module for outputting the DC component control of the voltage; and taking a sampled current value of each battery cluster as the negative input of the PI module for outputting the DC component control of the voltage, and obtaining the output value of the PI module for outputting the DC component control of the voltage.

Preferably, the output value of the PR module for outputting the AC component control of the voltage is obtained in the following manner:

processing a sampled voltage value of the DC bus capacitor by using a filter module, to obtain a DC component of the voltage of the DC bus capacitor, performing a subtraction on the voltage of DC bus capacitor and the DC component of the voltage of the DC bus capacitor to obtain an AC component of the voltage of the DC bus capacitor, and taking the AC component of the voltage of the DC bus capacitor as a positive input of the PR module for outputting the AC component control of the voltage; and processing a sampled value of the output voltage by using the filter module to obtain an average value of the output voltage in a switching cycle, processing the average value of the output voltage in the switching cycle by using the filter module to obtain a DC component of the output voltage, performing a subtraction on the average value of the output voltage in the switching cycle and the DC component of the output voltage to obtain an AC component of the output voltage, and taking the AC component of the output voltage as a negative input of the PR module for outputting the AC component control of the voltage to obtain the output value of the PR module for outputting the AC component control of the voltage.

Compared with the prior art, the present disclosure has the following beneficial effects.

1. Compared with a traditional chain-type BESS, the directly-connected high-voltage BESS provided in the present disclosure enables a plurality of battery clusters on a DC side of an H-bridge submodule to be connected in parallel and achieves higher power and a larger capacity without increasing the quantity of submodules. This solution does not increase the complexity of a control system of the chain-type BESS.

2. The three-level battery SOC equilibrium control method of the directly-connected high-voltage BESS in the present disclosure can realize SOC equilibrium between phases, between modules, and between clusters, and realize a division control technology based on the battery cluster.

3. Compared with the direct parallel connection between battery clusters in a traditional BESS, the method for coordinated current control between clusters in the directly-connected high-voltage BESS in the present disclosure can realize circulating current suppression between the battery clusters and active SOC and temperature equilibrium control between the clusters.

4. Compared with the traditional chain-type BESS, the frequency doubling current suppression policy of the battery cluster in the directly-connected high-voltage BESS in the present disclosure can reduce the use of an inductance filter and better suppress a frequency doubling current in the battery cluster.

BRIEF DESCRIPTION OF THE DRAWINGS

Other features, objectives, and advantages of the present disclosure will become more apparent by reading the detailed description of non-limiting embodiments with reference to the following accompanying drawings.

FIGS. 1A-1E show a circuit diagram of a directly-connected high-voltage BESS according to a preferred embodiment of the present disclosure, wherein FIGS. 1B-1E are enlarged views showing the corresponding areas in FIG. 1A;

FIGS. 2A-2B show a circuit diagram of a battery energy storage submodule of a directly-connected high-voltage BESS according to a preferred embodiment of the present disclosure, wherein FIG. 2B is an enlarged view showing the corresponding area in FIG. 2A;

FIGS. 4A-4D show control block diagrams of a method for coordinated current control between clusters of a directly-connected high-voltage BESS and a frequency doubling current suppression policy of a battery cluster of the directly-connected high-voltage BESS according to a preferred embodiment of the present disclosure, wherein FIGS. 4B-4D are enlarged views showing the corresponding areas in FIG. 4A;

FIGS. 5A-5E show a circuit diagram of a triangular directly-connected high-voltage BESS according to a preferred embodiment of the present disclosure, wherein FIGS. 5B-5E are enlarged views showing the corresponding areas in FIG. 5A; and FIGS. 6A-6K show a circuit diagram of a modular multilevel BESS according to a preferred embodiment of the present disclosure, wherein FIGS. 6B-6K are enlarged views showing the corresponding areas in FIG. 6A.

DETAILED DESCRIPTION OF THE EMBODIMENTS

The present disclosure is described in detail below with reference to specific embodiments. The following embodiments will help those skilled in the art to further understand the present disclosure but do not limit the present disclosure in any way. It should be noted that several variations and improvements can also be made by a person of ordinary skill in the art without departing from the concepts of the present disclosure. These all fall within the protection scope of the present disclosure.

To overcome the shortcomings in the prior art, the present disclosure is intended to provide a directly-connected high-voltage BESS and a control method thereof to further expand the power and capacity of a single directly-connected high-voltage BESS based on a cascaded H-bridge converter without causing the problems of a control delay, a circulating current of a battery, high costs, and others, and to suppress a frequency doubling current of the battery.

Embodiment 1

The present disclosure provides a directly-connected high-voltage BESS.

FIGS. 1A-1E show a circuit diagram of a directly-connected high-voltage BESS according to an embodiment of the present disclosure. As shown in FIGS. 1A-1E, each phase is composed of n cascaded power modules, and each of the power modules mainly includes m battery clusters, m DC/DC converters, a DC bus capacitor, and a DC/AC module. A cascaded H-bridge converter is directly connected to a grid through a filter inductor, an AC-side pre-charging device, and an AC fuse on an AC side. In the figure, $v_{sa}$, $v_{sb}$, $v_{sc}$, represent the voltages of a three-phase grid.

A plurality of battery modules is connected in series to form a battery cluster, the battery cluster is connected in series to the DC/DC converter to form a battery branch, and a plurality of battery branches is connected in parallel to form a battery stack.

The battery stack is connected in parallel to the DC bus capacitor $C_{bus}$ and connected to a DC port of the DC/AC converter to form a battery energy storage submodule.

AC ports of a plurality of battery energy storage submodules are connected in series to form a chain-type phase converter. One terminal of each of the three chain-type phase converters is connected to form neutral point O, and the other terminal of each of the three chain-type phase converters is connected to an AC grid through their respective grid-side filter inductors La, Lb, and Lc to form a three-phase chain-type BESS.

Figure 1A:
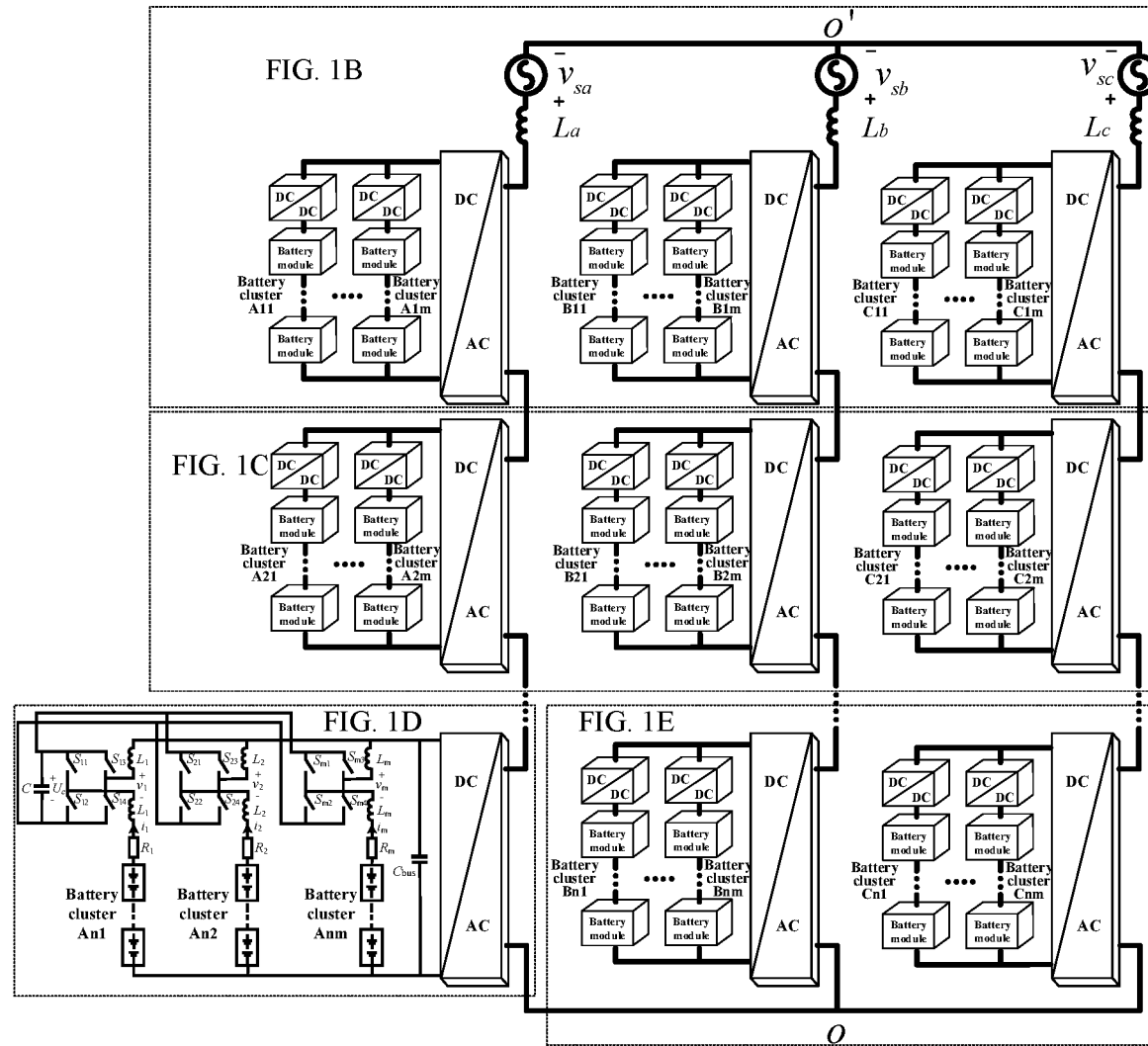
Figure 1B:
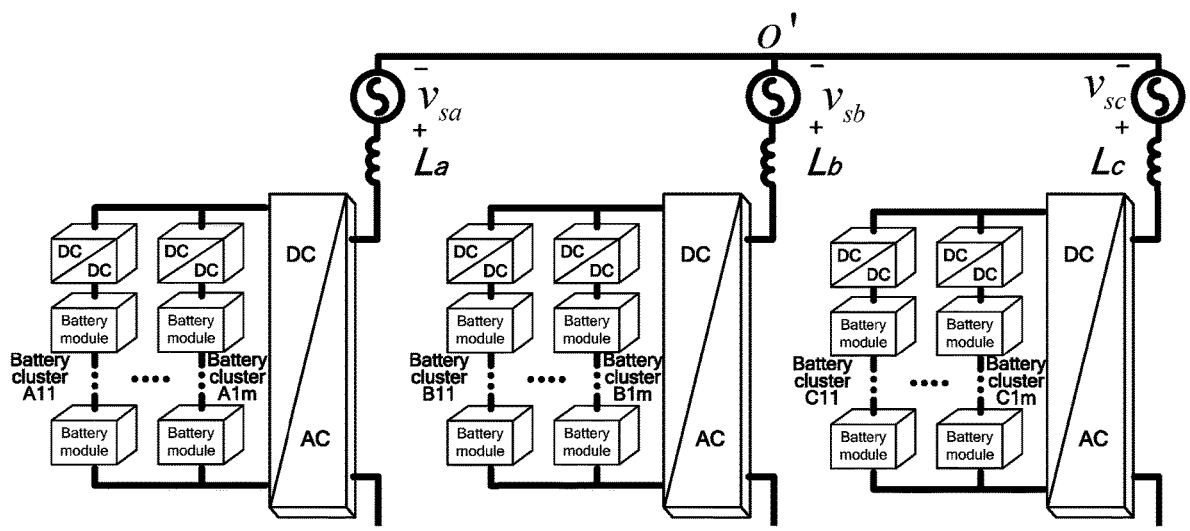
Figure 1C:
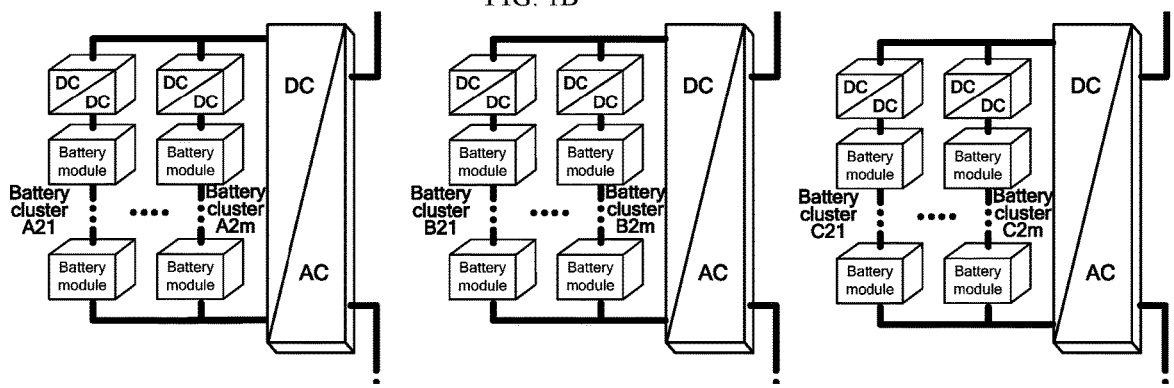
Figure 1D:
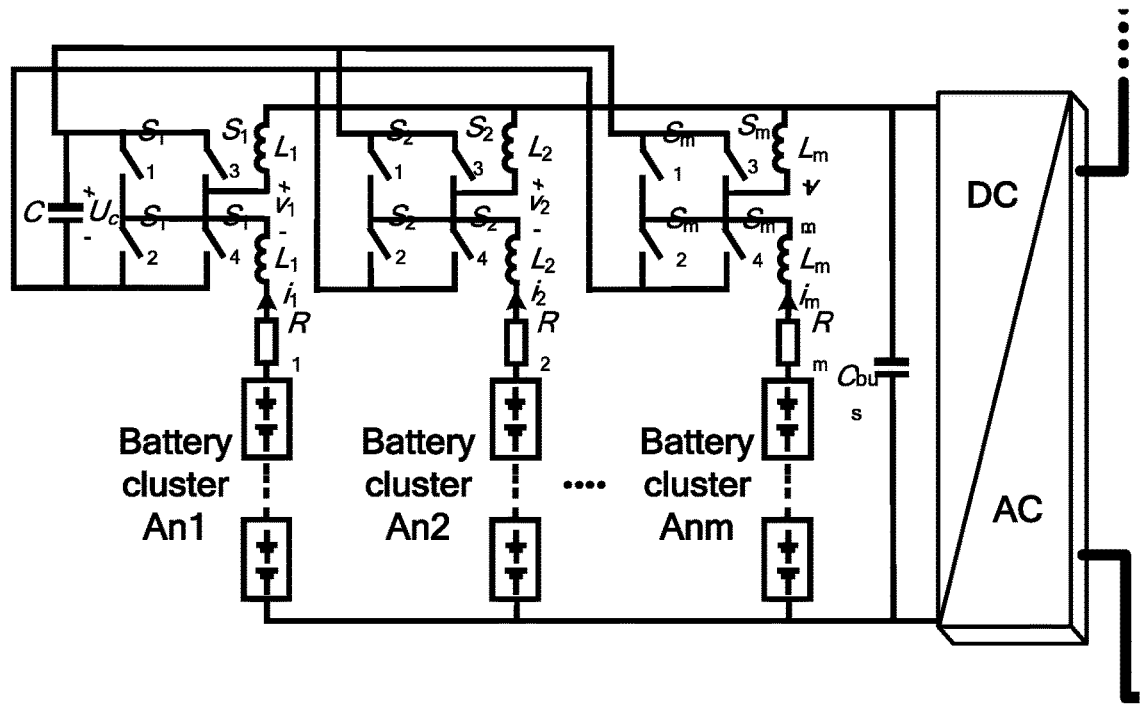
Figure 1E:
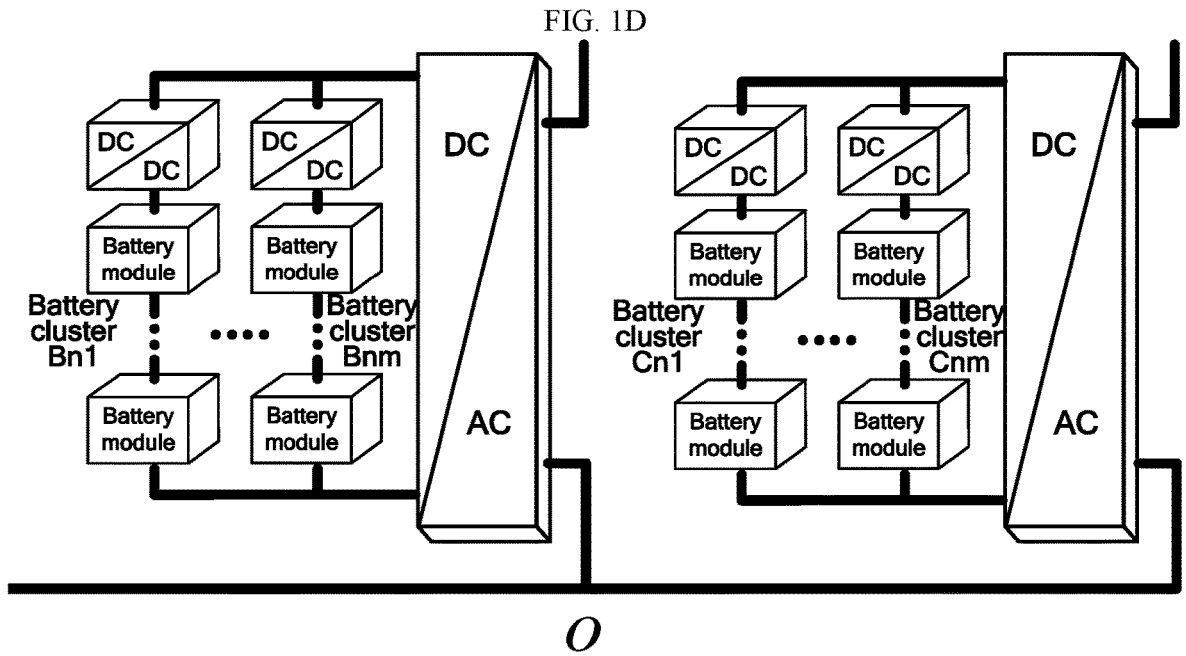
Figure 2A:
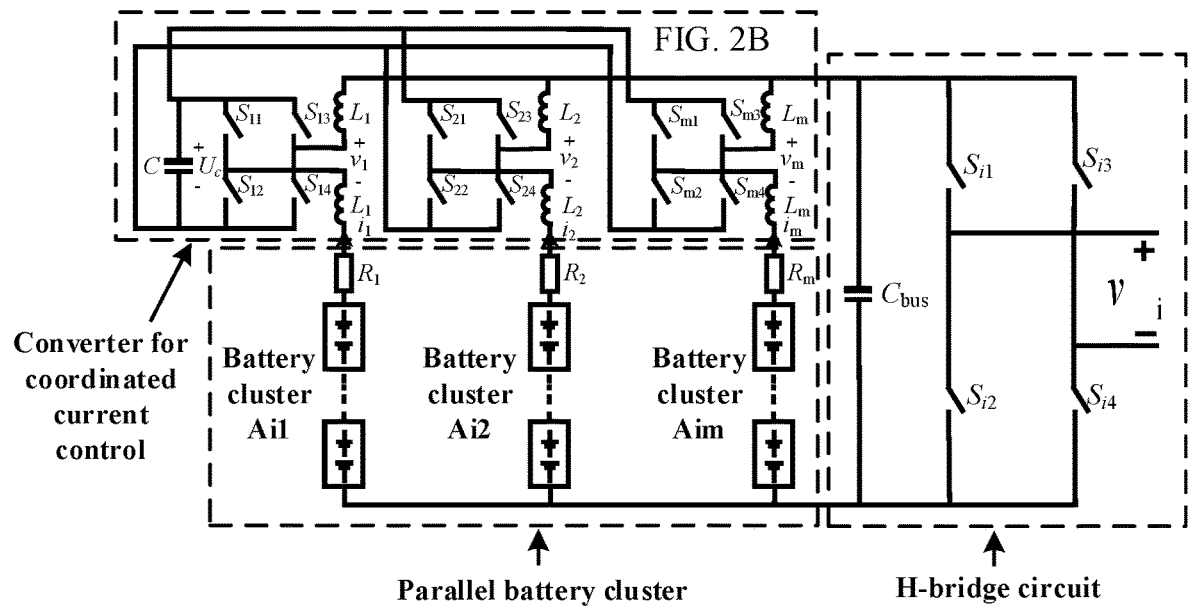
Figure 2B:
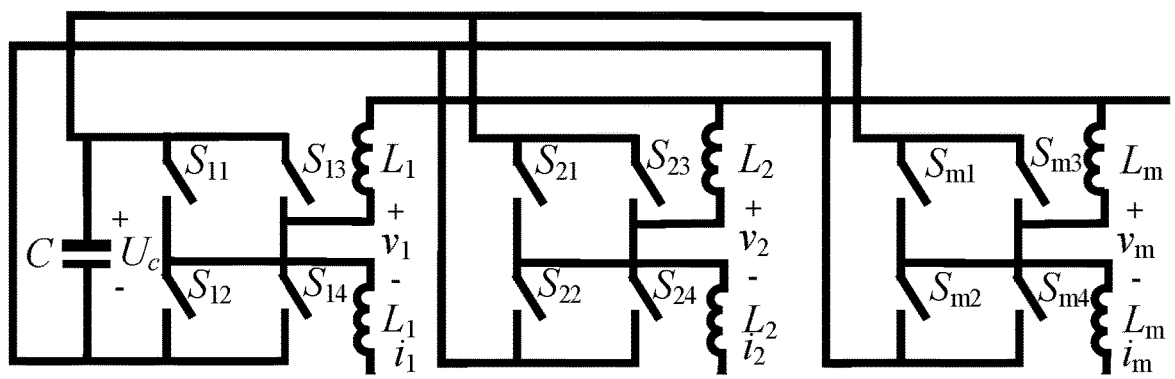

As shown in FIGS. 2A-2B, specifically, in each battery stack, DC ports of DC/DC converters in the battery branches are connected in parallel to common bus capacitor C, and the DC/DC converters in the battery branches together constitute a converter for coordinated current control between battery clusters.

Specifically, the converter for the coordinated current control between the battery clusters includes the common bus capacitor C, H-bridge circuits 1 to M, and filter inductors 1 to 2M, where M represents the quantity of battery clusters contained in one battery stack.

An $m^{th}$ (m=1, 2, . . . , M) H-bridge circuit in the H-bridge circuits includes four switch transistors $S_{m1}$ to $S_{m4}$, where $S_{m1}$ and $S_{m2}$ form a first bridge arm of the $m^{th}$ H-bridge circuit and $S_{m3}$ and $S_{m4}$ form a second bridge arm of the $m^{th}$ H-bridge circuit.

The first bridge arm and the second bridge arm of the $m^{th}$ H-bridge circuit are separately connected to the battery branch by using the filter inductor.

Figure 3:
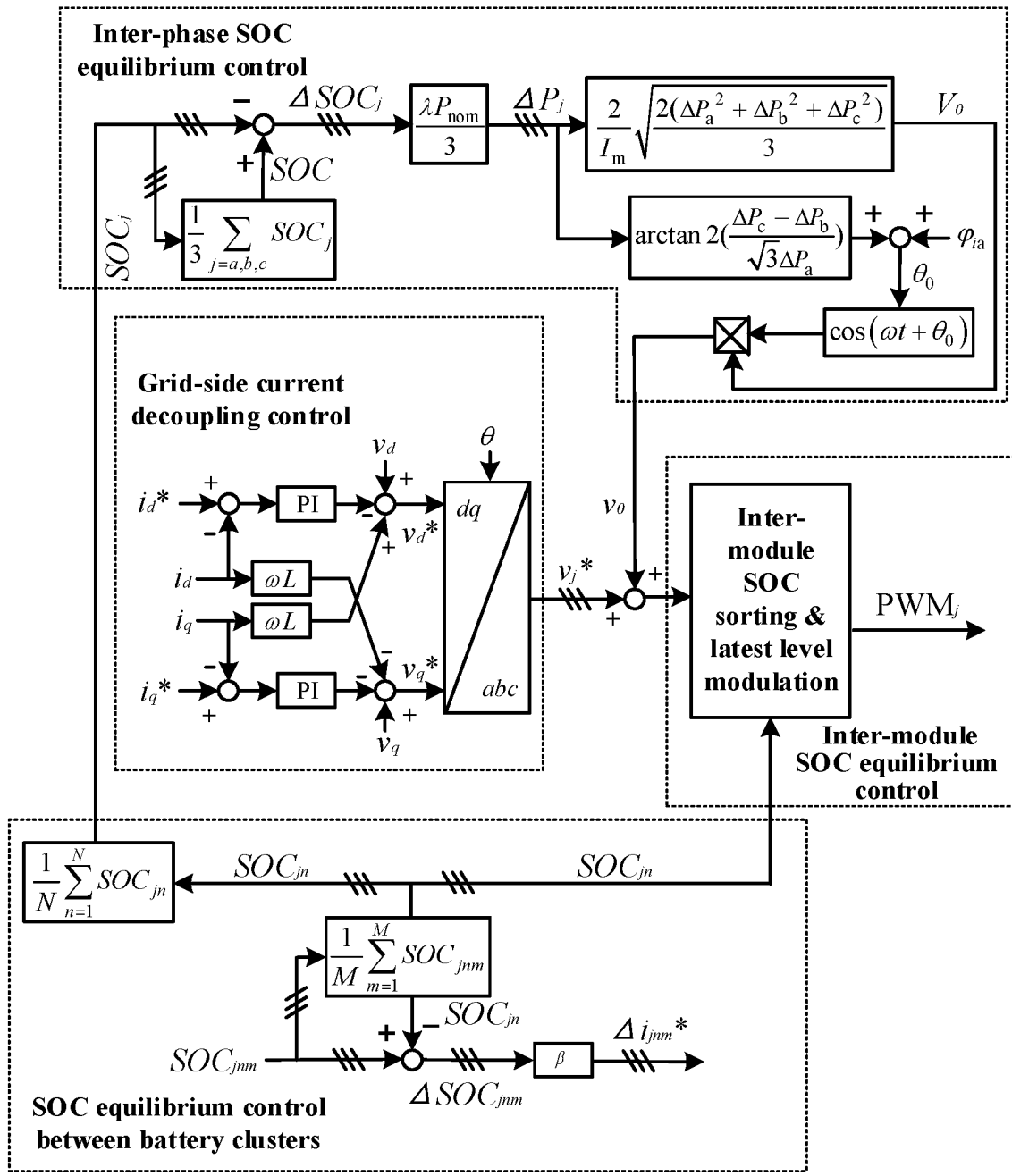
FIG. 3 is a control block diagram of a three-level battery SOC equilibrium control method of a directly-connected high-voltage BESS according to a preferred embodiment of the present disclosure.
Figure 4A:
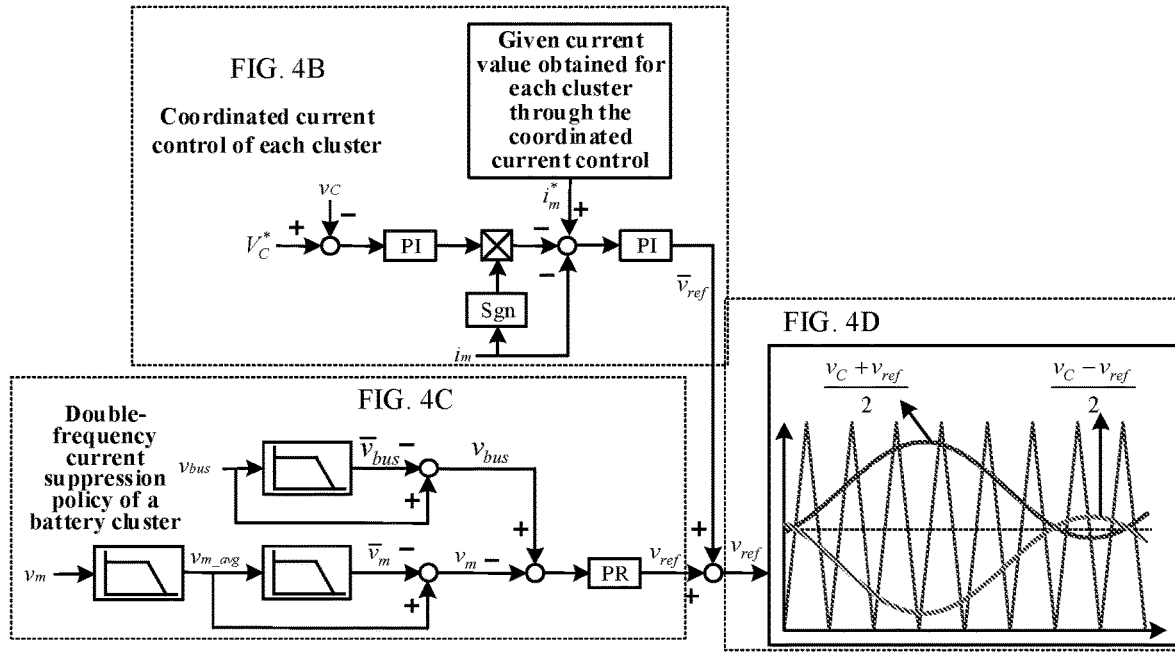
Figure 4B:
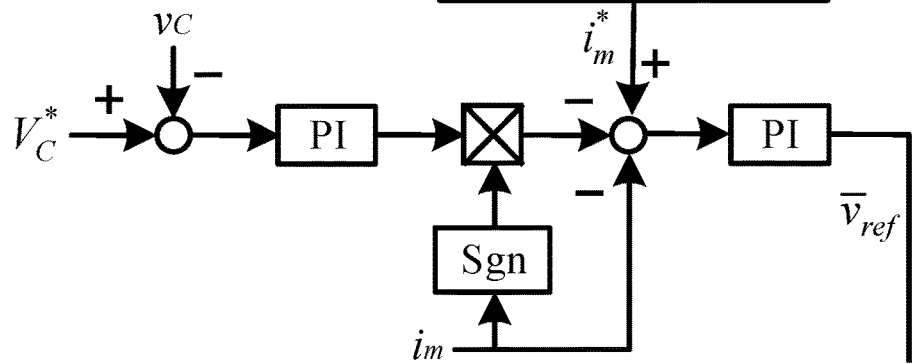
Figure 4C:
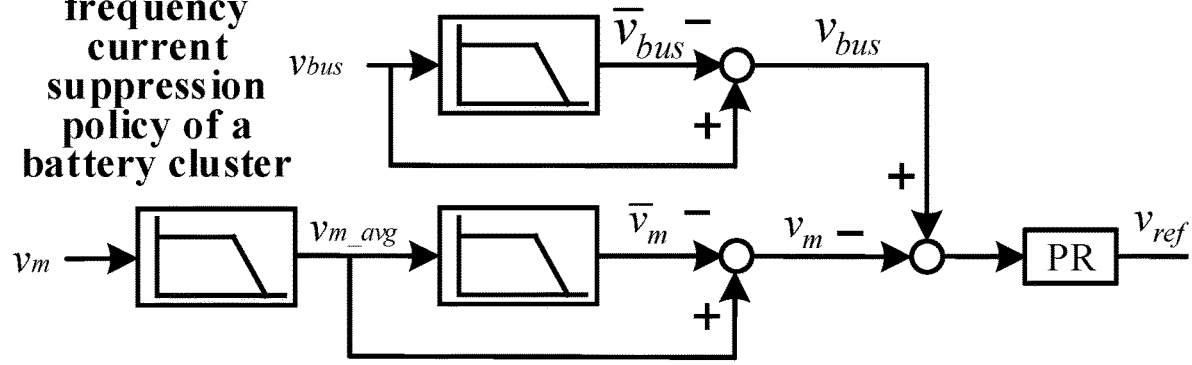
Figure 4D:
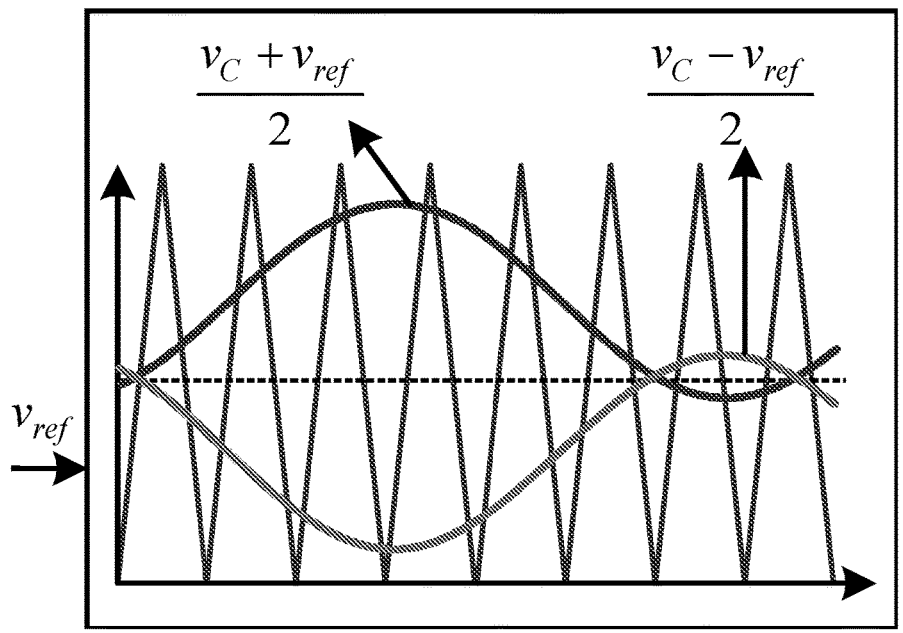
Figure 5A:
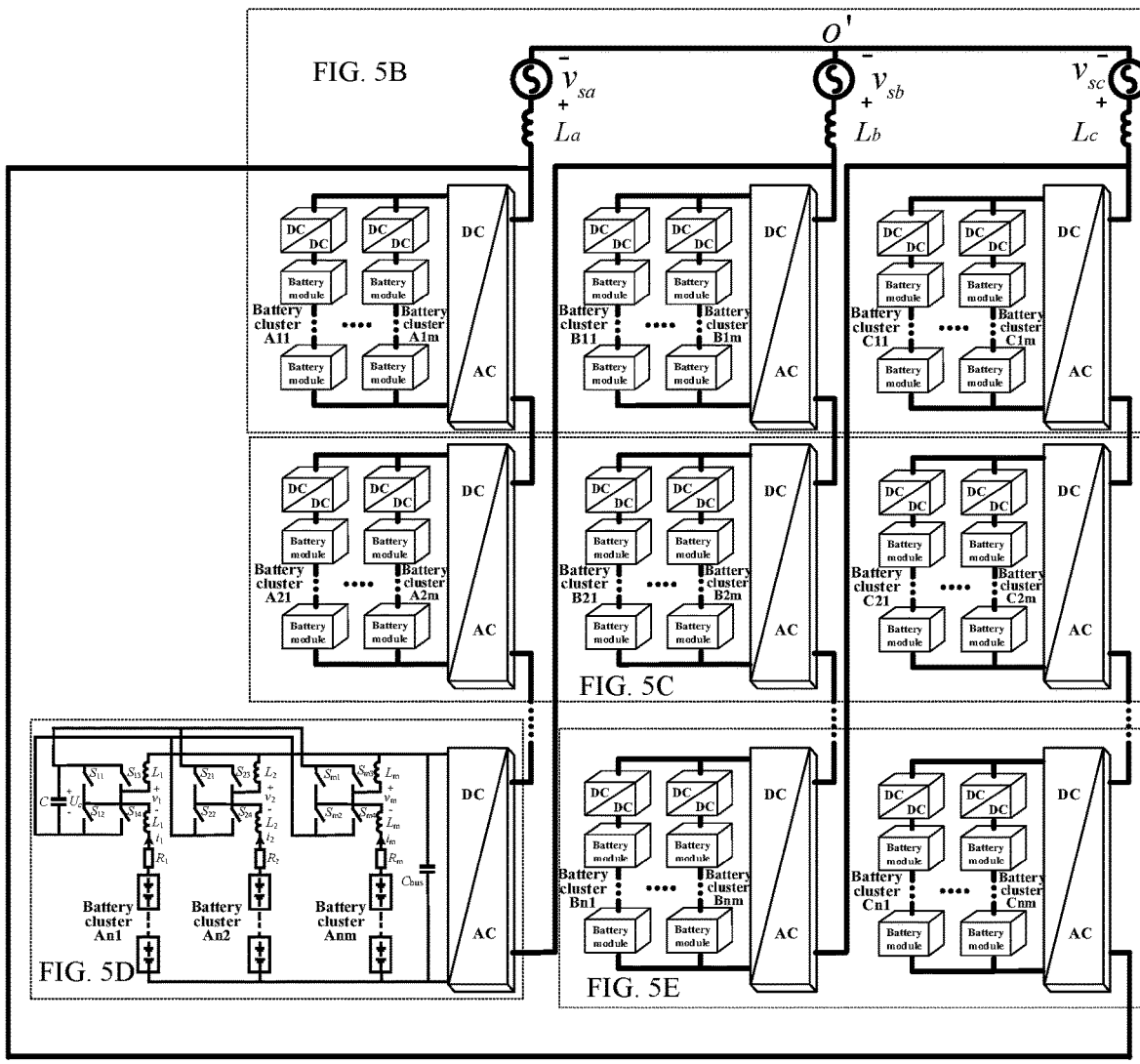
Figure 5B:
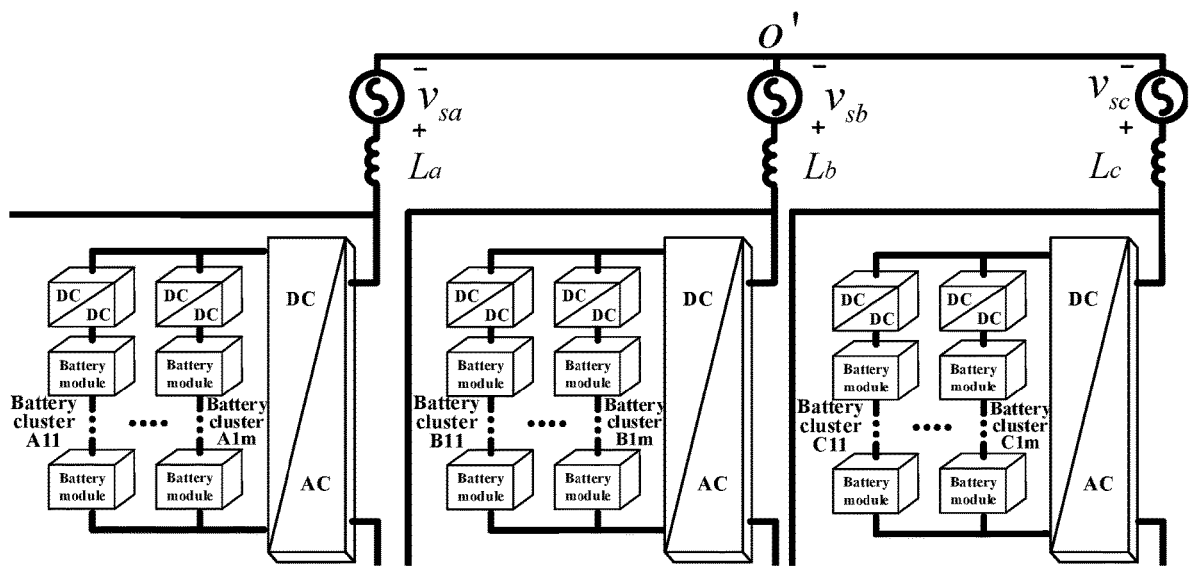
Figure 5C:
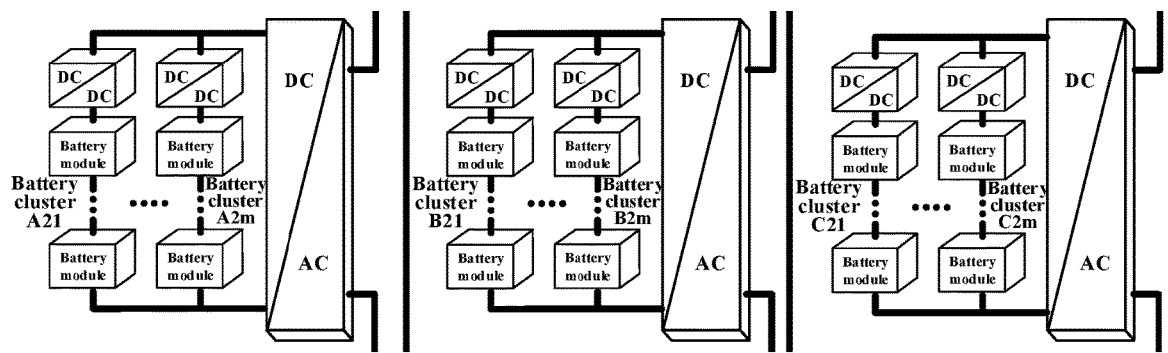
Figure 5D:
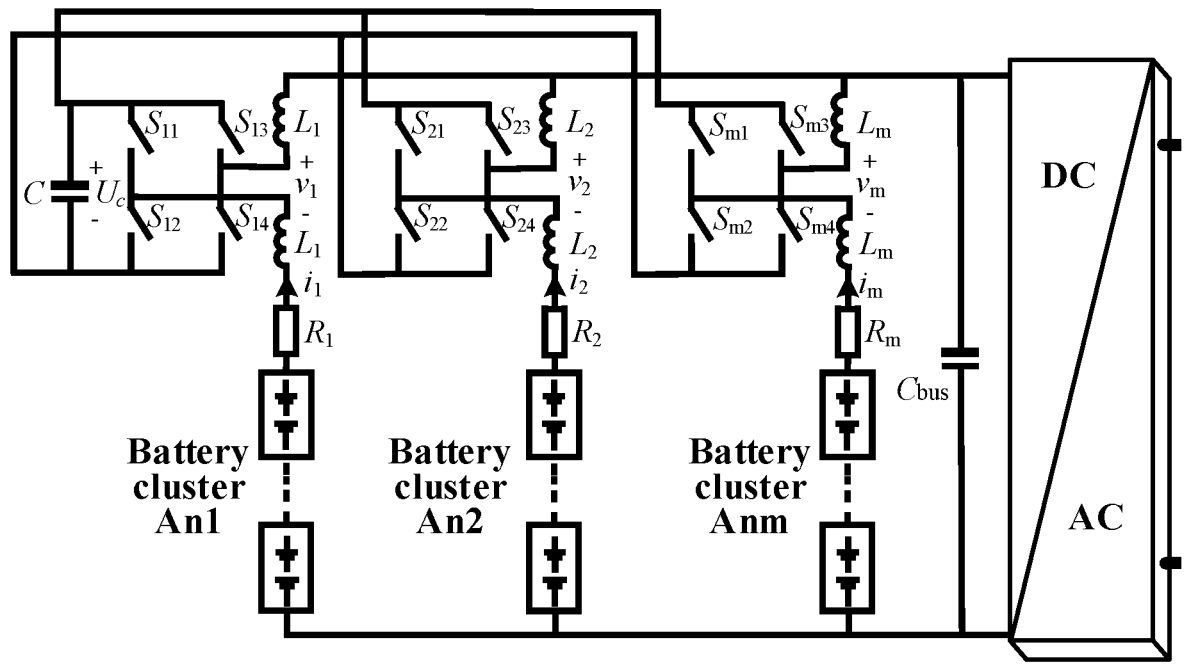
Figure 5E:
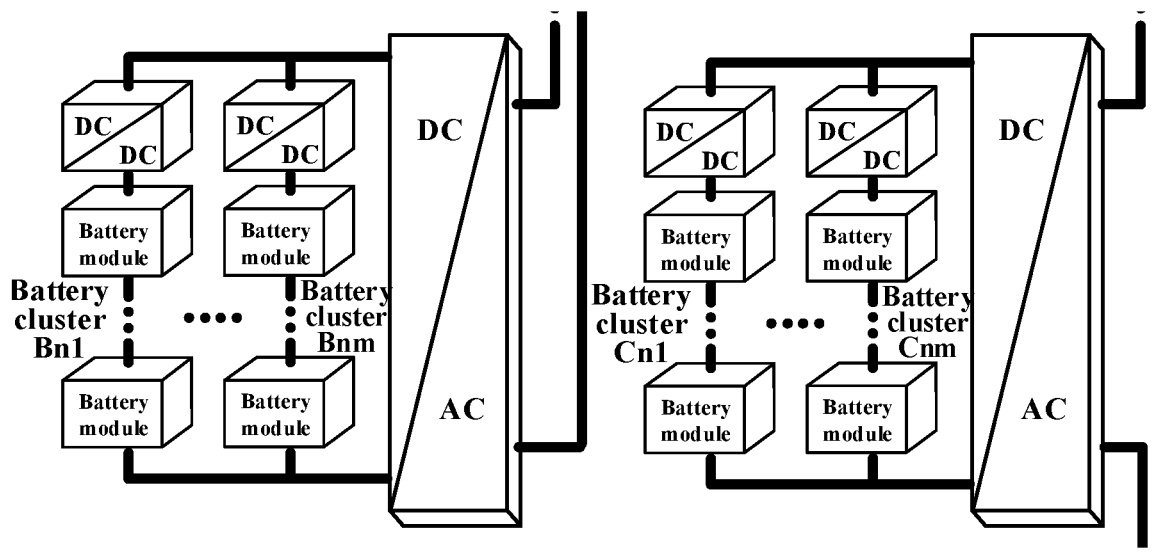
Figure 6A:
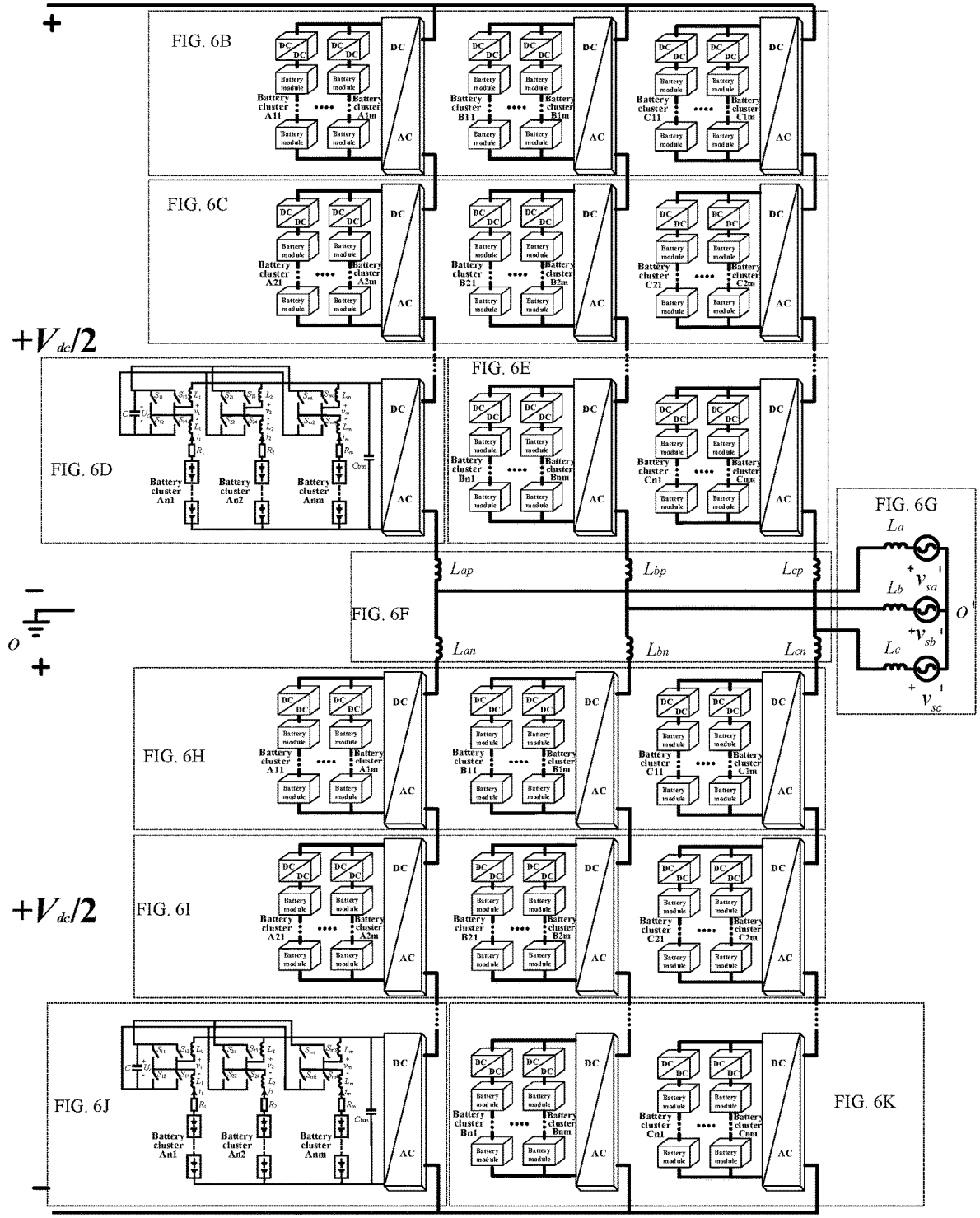
Figure 6B:
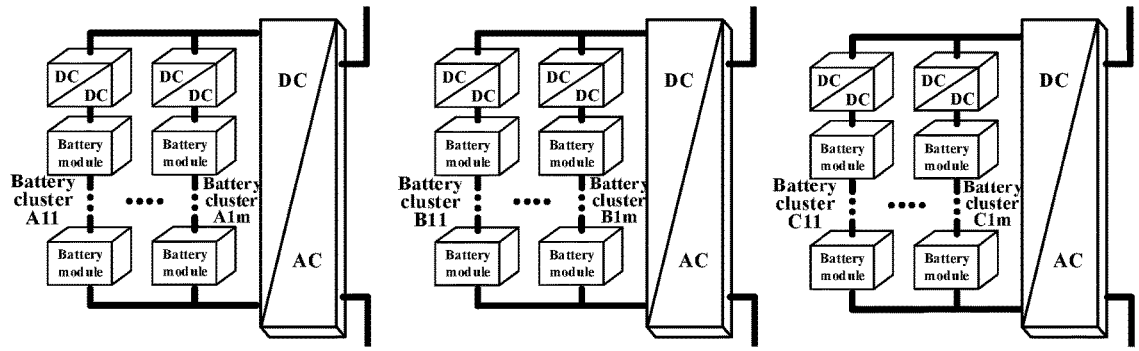
Figure 6C:
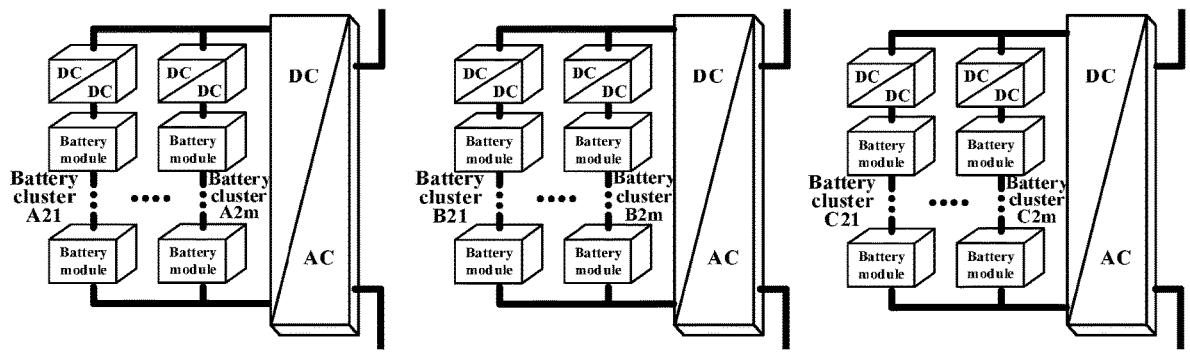
Figure 6D:
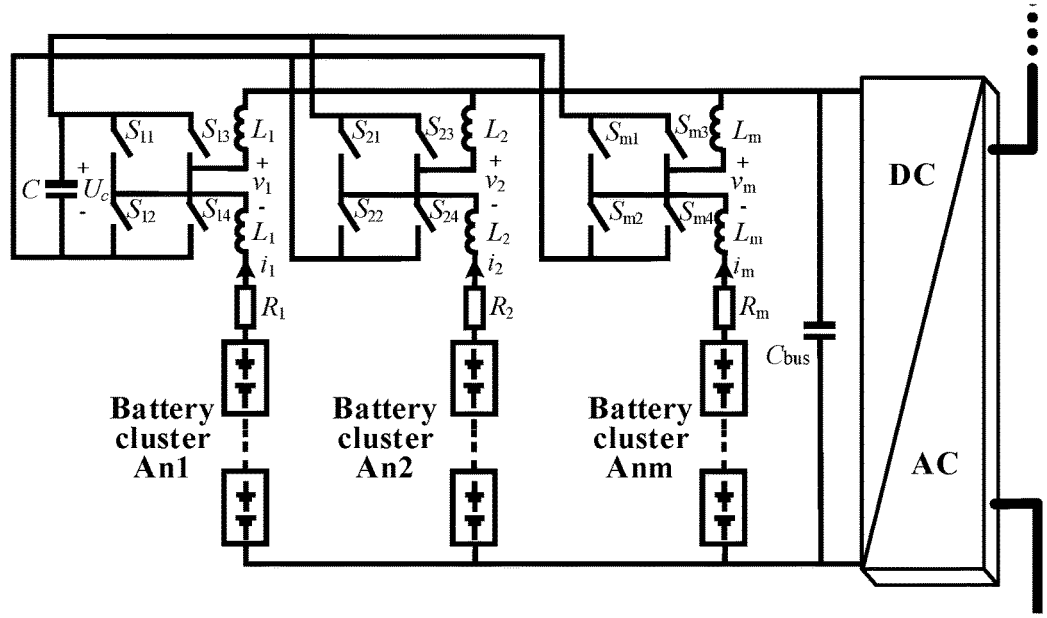
Figure 6E:
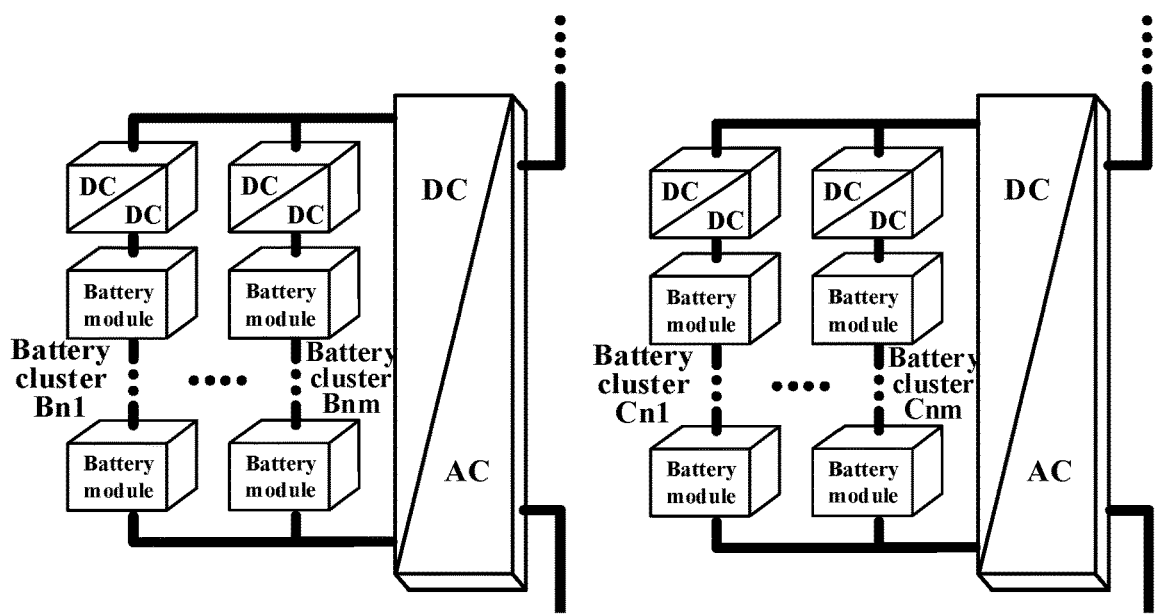
Figure 6F:
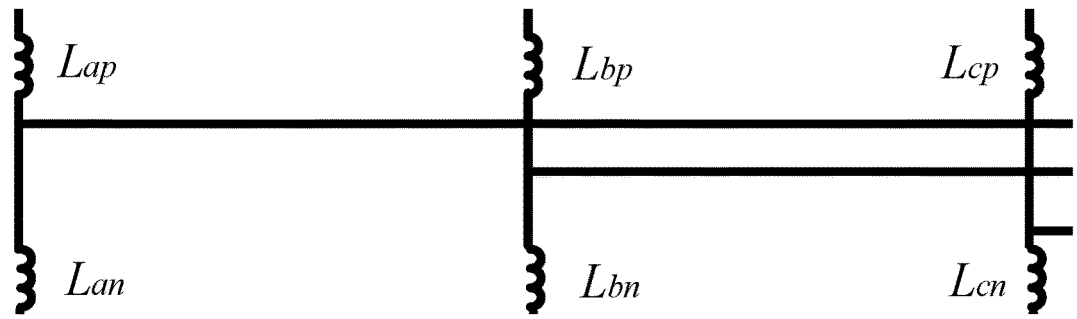
Figure 6G:
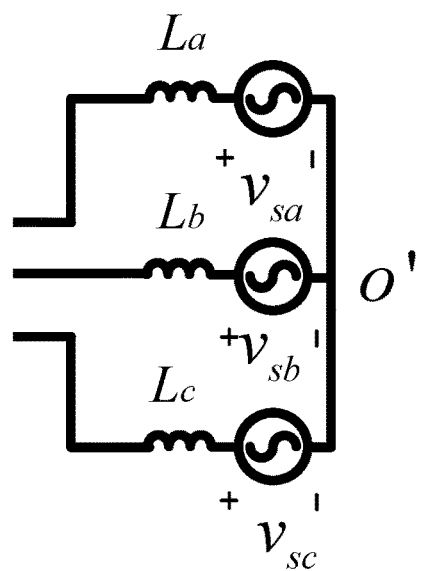
Figure 6H:
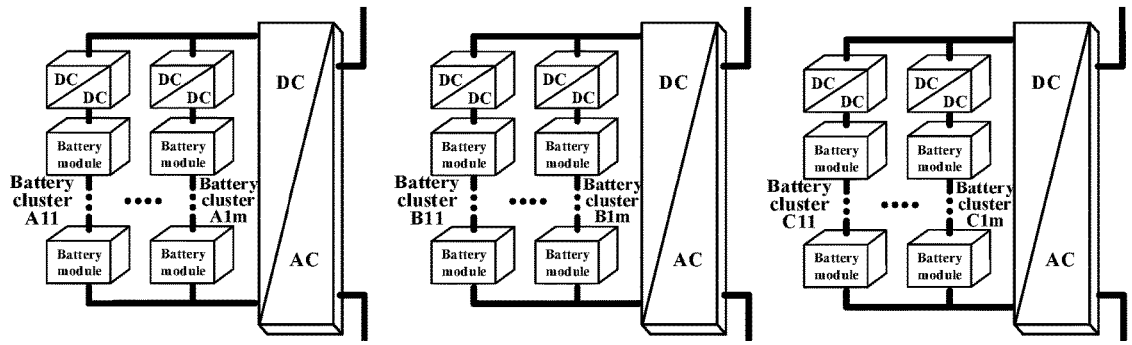
Figure 6I:
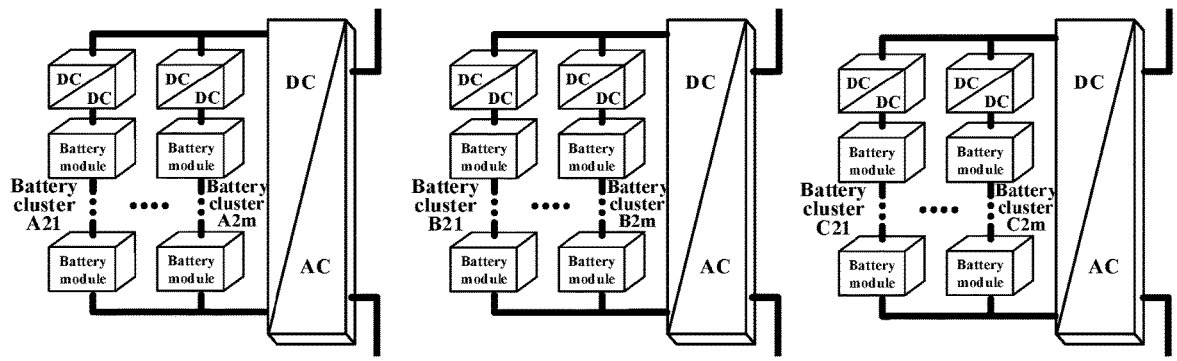
Figure 6J:
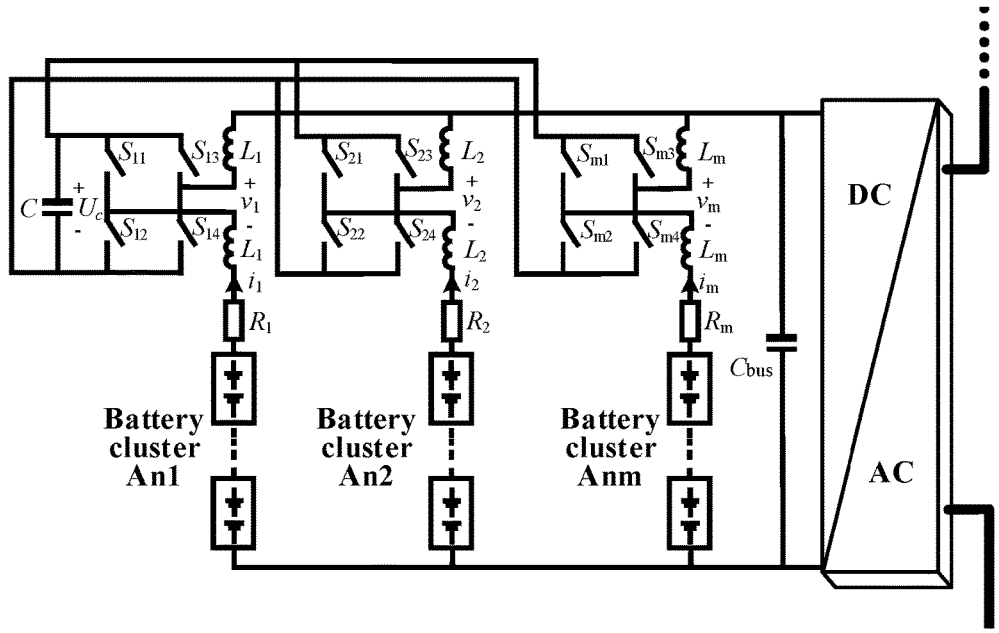
Figure 6K:
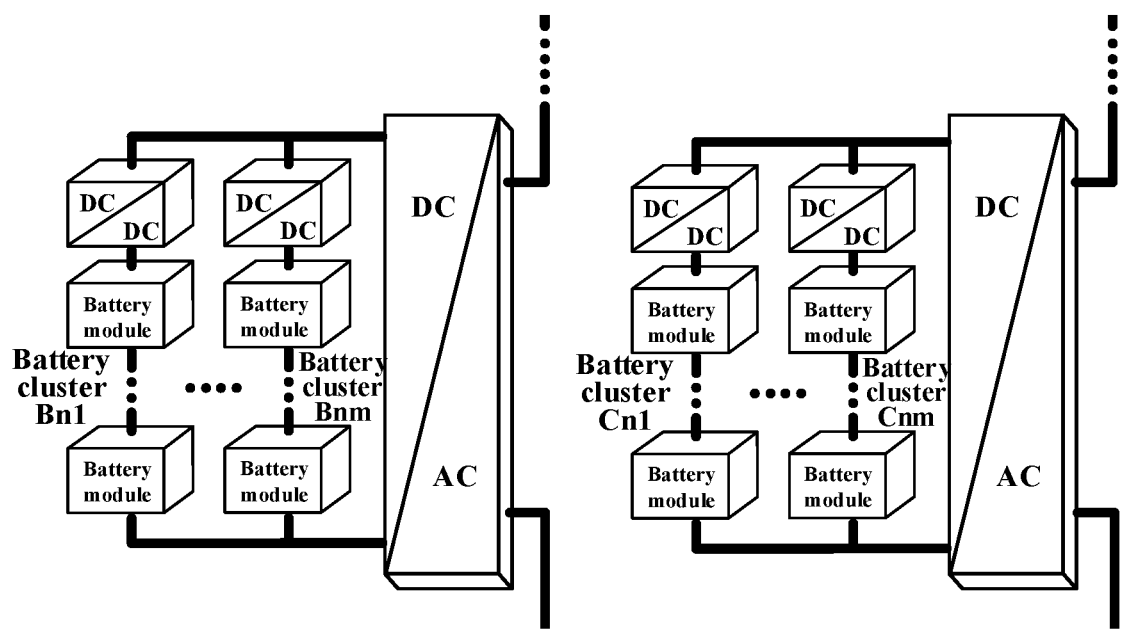

The present disclosure provides a three-level battery SOC equilibrium control method. As shown in FIG. 3, the above directly-connected high-voltage BESS is used to perform the following steps:

Battery SOC equilibrium control between battery clusters is performed: A correction amount of the charging and discharging current of each battery cluster is obtained based on a difference between battery SOCs of the battery clusters, and the charging and discharging current of each battery cluster is controlled based on the correction amount to achieve battery SOC equilibrium between the battery clusters.

Battery SOC equilibrium control between battery energy storage submodules is performed: Battery SOCs of the battery energy storage submodules are sorted, and required submodules are determined based on a current direction of a subordinate phase and the quantity of submodules required for modulation to achieve battery SOC equilibrium between the battery energy storage submodules.

Battery SOC equilibrium control between phases is performed: A correction amount of charging and discharging power of a chain-type converter of each phase is obtained based on a difference between battery SOCs of the phases, and a to-be-injected zero-sequence voltage is calculated based on the correction amount to achieve battery SOC equilibrium between the phases.

Specifically, the battery SOC equilibrium control between the battery is implemented in the following manner: Battery $SOC_{jnm}$ of each cluster in an $n^{th}$ (n=1, 2, . . . , N) battery energy storage submodule in a chain-type converter of phase j (j=a, b, c) is collected, and average battery $SOC_{jn}$ of each cluster is calculated, where the average battery $SOC_{jn}$ of each cluster is a battery SOC of the $n^{th}$ battery energy storage submodule. After a subtraction is performed on the battery SOC of each cluster and its average value, the correction amount of the charging and discharging current of each battery cluster is obtained based on a preset proportionality factor of the battery SOC equilibrium between the clusters, namely, $\Delta i^*_{jnm} = \beta \Delta SOC_{jnm}$, where $\Delta SOC_{jnm}$ represents a difference between battery $SOC_{jnm}$ of an $m^{th}$ battery cluster and the battery $SOC_{jn}$ of the $n^{th}$ battery energy storage submodule, β represents the proportionality factor of the battery SOC equilibrium between the clusters, and $\Delta i^*_{jnm}$ represents a correction amount of a battery charging and discharging current of the $m^{th}$ battery cluster. The correction amount of the charging and discharging current of each battery cluster is transferred to a controller of the converter for the coordinated current control between the battery clusters to calculate a given current of each cluster.

Specifically, the battery SOC equilibrium control between the battery energy storage submodules is implemented in the following manner: Battery $SOC_{jn}$ of each battery energy storage submodule of phase j is collected. The battery SOC of each battery energy storage submodule of phase j is sorted. A driving signal of each battery energy storage submodule is determined based on the current direction of the phase j and the quantity of submodules required for latest level modulation.

Specifically, the battery SOC equilibrium control between the phases is implemented in the following manner: The battery $SOC_{jn}$ of each battery energy storage submodule of the phase j is collected, and average battery $SOC_j$ of the battery energy storage submodule is calculated, where the average battery $SOC_j$ of the battery energy storage submodule is a battery SOC of the chain-type converter of the phase j. An average battery SOC of a three-phase chain-type converter is calculated, where the average battery SOC of the three-phase chain-type converter is a battery SOC of the three-phase chain-type BESS. After a subtraction is performed on the SOC of the chain-type converter of each phase and its average value, the correction amount of the charging and discharging power of the chain-type converter of each phase is obtained based on a preset proportionality factor of the battery SOC equilibrium between the phases. An amplitude and a phase of the to-be-injected zero-sequence voltage are obtained based on the correction amount of the charging and discharging power of the chain-type converter of each phase.

The present disclosure provides a method for coordinated current control and frequency doubling current suppression between clusters. As shown in FIGS. 4A-4D, the above directly-connected high-voltage BESS is used to perform the following steps:

Summation is performed on an output value of a PI module for outputting a DC component control of a voltage and an output value of a PR module for outputting an AC component control of the voltage to obtain a modulated wave of the DC/DC converter. A corresponding pulse width modulation (PWM) signal is generated based on the modulated wave of the DC/DC converter, and the DC/DC converter is controlled based on the generated PWM signal.

Specifically, the output value of the PI module for outputting the DC component control of the voltage is obtained in the following manner: A given current value of each battery cluster under objective optimization is obtained based on a SOC, temperature, impedance, and a total current of the battery cluster, and the given current value is taken as a positive input of the PI module for outputting the DC component control of the voltage.

A given voltage value of the common bus capacitor is taken as a positive input of a PI module of the voltage loop of common bus capacitor, and a sampled voltage value of the common bus capacitor is taken as a negative input of the PI module of the voltage loop of common bus capacitor to obtain an output value of the PI module of the voltage loop of common bus capacitor.

The current of each battery cluster is made to pass through a symbolic function module, an output value of the symbolic function module is multiplied by the output value of the PI module of the voltage loop of common bus capacitor, and a product is taken as a negative input of the PI module for outputting the DC component control of the voltage.

A sampled current value of each battery cluster is taken as the negative input of the PI module for outputting the DC component control of the voltage, and the output value of the PI module for outputting the DC component control of the voltage is obtained.

Specifically, the output value of the PR module for outputting the AC component control of the voltage is obtained in the following manner:

A sampled voltage value of the DC bus capacitor is processed by using a filter module to obtain a DC component of the voltage of the DC bus capacitor. Subtraction is performed on the voltage of the DC bus capacitor and the AC component of the voltage of the DC bus capacitor voltage to obtain an AC component of the voltage of the DC bus capacitor, and the AC component of the voltage of the DC bus capacitor is taken as a positive input of the PR module for outputting the AC component control of the voltage.

A sampled value of the output voltage is processed by using the filter module to obtain an average value of the output voltage in a switching cycle. The average value of the output voltage in the switching cycle is processed by using the filter module to obtain a DC component of the output voltage. Subtraction is performed on the average value of the output voltage in the switching cycle and the DC component of the output voltage to obtain an AC component of the output voltage. The AC component of the output voltage is taken as a negative input of the PR module for outputting the AC component control of the voltage to obtain the output value of the PR module for outputting the AC component control of the voltage.

FIGS. 5A-5E show a circuit diagram of a triangular directly-connected high-voltage BESS according to an embodiment of the present disclosure. Similar to the star-shaped directly-connected high-voltage BESS in FIGS. 1A-1E, the voltage of each phase of the triangular directly-connected high-voltage BESS is a grid-side line voltage to achieve a larger capacity of a single system. Each phase is composed of n cascaded power modules, and each of the power modules mainly includes m battery clusters, m DC/DC converters, a DC bus capacitor, and a DC/AC module. A cascaded H-bridge converter is directly connected to a grid through a filter inductor, an AC-side pre-charging device, and an AC fuse on an AC side. In the figure, $v_{sa}$, $v_{sb}$, $v_{sc}$ represent the voltages of a three-phase grid.

A plurality of battery modules is connected in series to form a battery cluster, the battery cluster is connected in series to the DC/DC converter to form a battery branch, and a plurality of battery branches is connected in parallel to form a battery stack.

The battery stack is connected in parallel to the DC bus capacitor and then connected to a DC port of the DC/AC converter to form a battery energy storage submodule.

AC ports of a plurality of battery energy storage submodules are connected in series to form a chain-type phase converter. Two terminals of each of the three chain-type phase converters are connected to each other to form a loop. Connection points of each two chain-type phase converters are connected to an AC grid through a grid-side filter inductor to form a triangular three-phase chain-type BESS.

FIGS. 6A-6K show a circuit diagram of a modular multilevel BESS according to an embodiment of the present disclosure. The system can control more batteries, achieve a greater capacity, and has a common DC port to realize power distribution control between a DC bus, an AC grid, and an energy storage battery. Each phase is composed of 2n cascaded power modules, and each of the power modules mainly includes m battery clusters, m DC/DC converters, a DC bus capacitor, and a DC/AC module. The converter has upper and lower bridge arm filter inductors and is directly connected to a grid through a filter inductor, an AC-side pre-charging device, and an AC fuse on the AC side. In the figure, $v_{sa}$, $v_{sb}$, $v_{sc}$ represent the voltages of a three-phase grid.

A plurality of battery modules is connected in series to form a battery cluster, the battery cluster is connected in series to the DC/DC converter to form a battery branch, and a plurality of battery branches is connected in parallel to form a battery stack.

The battery stack is connected in parallel to the DC bus capacitor and then connected to a DC port of the DC/AC converter to form a battery energy storage submodule.

AC ports of n battery energy storage submodules are connected in series to form a bridge arm converter. Upper and lower bridge arm converters are connected in series through the two bridge arm filter inductors to form a phase converter. Two terminals of each of the three phase converters are connected to form a DC bus. Connection points of the two bridge arm filter inductors of each phase converter are connected to the AC grid through one grid-side filter inductor to form the modular multilevel BESS.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be freely combined with each other in a non-conflicting manner.

What is claimed is:

1. A directly-connected high-voltage battery energy storage system (BESS), comprising:
    a battery module, a direct current (DC)/DC converter, a DC bus capacitor, a DC/alternating current (AC) converter, and a grid-side filter inductor, wherein
    a plurality of battery modules is connected in series to form a battery cluster, the battery cluster is connected in series to the DC/DC converter to form a battery branch, and a plurality of battery branches is connected in parallel to form a battery stack;
    the battery stack is connected in parallel to the DC bus capacitor, and then connected to a DC port of the DC/AC converter to form a battery energy storage submodule; and
    AC ports of a plurality of battery energy storage submodules are connected in series to form a chain-type phase converter, a first terminal of each of three chain-type phase converters is connected to form a neutral point, and a second terminal of each of the three chain-type phase converters is connected to an AC grid through the grid-side filter inductors of the three chain-type phase converters to form a three-phase chain-type BESS.

2. The directly-connected high-voltage BESS according to claim 1, wherein in each battery stack, DC ports of DC/DC converters in the plurality of battery branches are connected in parallel to a common bus capacitor, and the DC/DC converters in the plurality of battery branches together constitute a converter for a coordinated current control between battery clusters.

3. The directly-connected high-voltage BESS according to claim 2, wherein the converter for the coordinated current control between the battery clusters comprises the common bus capacitor, M H-bridge circuits, and 2M filter inductors;
    an $m^{th}$ H-bridge circuit in the H-bridge circuits comprises four switch transistors $S_{m1}$ to $S_{m4}$; and $S_{m1}$ and $S_{m2}$ form a first bridge arm of the $m^{th}$ H-bridge circuit, and $S_{m3}$ and $S_{m4}$ form a second bridge arm of the $m^{th}$ H-bridge circuit; and
    the first bridge arm and the second bridge arm of the $m^{th}$ H-bridge circuit are separately connected to the battery branch by using the filter inductor.

4. A three-level battery state of charge (SOC) equilibrium control method, wherein the directly-connected high-voltage BESS according to claim 1 is configured to perform the following steps:
    a battery SOC equilibrium control between battery clusters: obtaining a correction amount of a charging and discharging current of each of the battery clusters based on a difference between battery SOCs of the battery clusters, and controlling the charging and discharging current of each of the battery clusters based on the correction amount of the charging and discharging current of each of the battery clusters to achieve a battery SOC equilibrium between the battery clusters;
    a battery SOC equilibrium control between battery energy storage submodules: sorting battery SOCs of the battery energy storage submodules and determining required submodules based on a current direction of a subordinate phase and a quantity of submodules required for modulation to achieve a battery SOC equilibrium between the battery energy storage submodules; and
    a battery SOC equilibrium control between phases: obtaining a correction amount of a charging and discharging power of a chain-type converter of each of the phases based on a difference between battery SOCs of the phases and then calculating a to-be-injected zero-sequence voltage based on the correction amount of the charging and discharging power of the chain-type converter of each of the phases to achieve a battery SOC equilibrium between the phases.

5. The three-level battery SOC equilibrium control method according to claim 4, wherein the battery SOC equilibrium control between the battery clusters is implemented in the following steps:
    collecting a battery $SOC_{jnm}$ of each of the battery clusters in an $n^{th}$ battery energy storage submodule in a chain-type converter of a phase j, and calculating an average battery $SOC_{jn}$ of each of the battery clusters, wherein the average battery $SOC_{jn}$ of each of the battery clusters is a battery SOC of the $n^{th}$ battery energy storage submodule;
    after performing a subtraction on the battery SOC of each of the battery clusters and the average value of the battery SOC of each of the battery clusters, obtaining the correction amount of the charging and discharging current of each of the battery clusters based on a proportionality factor of the battery SOC equilibrium between the battery clusters, namely, $\Delta i^*_{jnm} = \beta \Delta SOC_{jnm}$, wherein $\Delta SOC_{jnm}$ represents a difference between a battery $SOC_{jnm}$ of an $m^{th}$ battery cluster and the battery $SOC_{jn}$ of the $n^{th}$ battery energy storage submodule, $\beta$ represents the proportionality factor of the battery SOC equilibrium between the battery clusters, and $\Delta i^*_{jnm}$ represents a correction amount of a battery charging and discharging current of the $m^{th}$ battery cluster; and
    transferring the correction amount of the charging and discharging current of each of the battery clusters to a controller of the converter for a coordinated current control between the battery clusters to calculate a given current of each of the battery clusters.

6. The three-level battery SOC equilibrium control method according to claim 4, wherein the battery SOC equilibrium control between the battery energy storage submodules is implemented in the following steps:
    collecting a battery $SOC_{jn}$ of each of the battery energy storage submodules of a phase j, sorting the battery SOC of each of the battery energy storage submodules of the phase j, and determining a driving signal of each of the battery energy storage submodules based on a current direction of the phase j and a quantity of submodules required for a latest level modulation.

7. The three-level battery SOC equilibrium control method according to claim 4, wherein the battery SOC equilibrium control between the phases is implemented in the following steps:
collecting a battery $SOC_{jn}$ of each of the battery energy storage submodules of a phase j and calculating an average battery $SOC_j$ of the battery energy storage submodule, wherein the average battery $SOC_j$ of the battery energy storage submodule is a battery SOC of a chain-type converter of the phase j;
calculating an average battery SOC of a three-phase chain-type converter, wherein the average battery SOC of the three-phase chain-type converter is a battery SOC of the three-phase chain-type BESS;
after performing a subtraction on an SOC of the chain-type converter of each of the phases and the average value of the SOC of the chain-type converter of each of the phases, obtaining the correction amount of the charging and discharging power of the chain-type converter of each of the phases based on a proportionality factor of the battery SOC equilibrium between the phases; and
calculating an amplitude and a phase of the to-be-injected zero-sequence voltage based on the correction amount of the charging and discharging power of the chain-type converter of each of the phases.

8. The three-level battery SOC equilibrium control method according to claim 4, wherein in the directly-connected high-voltage BESS, in each battery stack, DC ports of DC/DC converters in the plurality of battery branches are connected in parallel to a common bus capacitor, and the DC/DC converters in the plurality of battery branches together constitute a converter for a coordinated current control between battery clusters.

9. The three-level battery SOC equilibrium control method according to claim 8, wherein in the directly-connected high-voltage BESS, the converter for the coordinated current control between the battery clusters comprises the common bus capacitor, M H-bridge circuits, and 2M filter inductors;
an $m^{th}$ H-bridge circuit in the H-bridge circuits comprises four switch transistors $S_{m1}$ to $S_{m4}$; and $S_{m1}$ and $S_{m2}$ form a first bridge arm of the $m^{th}$ H-bridge circuit, and $S_{m3}$ and $S_{m4}$ form a second bridge arm of the $m^{th}$ H-bridge circuit; and
the first bridge arm and the second bridge arm of the $m^{th}$ H-bridge circuit are separately connected to the battery branch by using the filter inductor.

10. A method for a coordinated current control and frequency doubling current suppression between battery clusters, wherein the directly-connected high-voltage BESS according to claim 1 is configured to perform the following steps:
performing a summation on an output value of a proportional integral (PI) module for outputting a DC component control of a voltage and an output value of a proportional resonant (PR) module for outputting an AC component control of the voltage to obtain a modulated wave of the DC/DC converter, generating a pulse width modulation (PWM) signal based on the modulated wave of the DC/DC converter, and controlling the DC/DC converter based on the PWM signal.

11. The method according to claim 10, wherein the output value of the PI module for outputting the DC component control of the voltage is obtained in the following manner:

calculating a given current value of each of the battery clusters under an objective optimization based on an SOC, a temperature, an impedance, and a total current of the battery cluster, and taking the given current value as a positive input of the PI module for outputting the DC component control of the voltage;
taking a given voltage value of a common bus capacitor as a positive input of a PI module of a voltage loop of common bus capacitor and taking a sampled voltage value of the common bus capacitor as a negative input of the PI module of the voltage loop of common bus capacitor to obtain an output value of the PI module of the voltage loop of common bus capacitor;
making the current of each of the battery clusters pass through a symbolic function module, multiplying an output value of the symbolic function module by the output value of the PI module of the voltage loop of common bus capacitor to obtain a product, and taking the product as a negative input of the PI module for outputting the DC component control of the voltage;
and taking a sampled current value of each of the battery clusters as the negative input of the PI module for outputting the DC component control of the voltage and obtaining the output value of the PI module for outputting the DC component control of the voltage.

12. The method according to claim 10, wherein the output value of the PR module for outputting the AC component control of the voltage is obtained in the following manner:
processing a sampled voltage value of the DC bus capacitor by using a filter module to obtain a DC component of the voltage of the DC bus capacitor, performing a subtraction on the voltage of DC bus capacitor and the DC component of the voltage of the DC bus capacitor to obtain an AC component of the voltage of the DC bus capacitor, and taking the AC component of the voltage of the DC bus capacitor as a positive input of the PR module for outputting the AC component control of the voltage; and
processing a sampled value of the output voltage by using the filter module to obtain an average value of the output voltage in a switching cycle, processing the average value of the output voltage in the switching cycle by using the filter module to obtain a DC component of the output voltage, performing a subtraction on the average value of the output voltage in the switching cycle and the DC component of the output voltage to obtain an AC component of the output voltage, and taking the AC component of the output voltage as a negative input of the PR module for outputting the AC component control of the voltage to obtain the output value of the PR module for outputting the AC component control of the voltage.

13. The method according to claim 10, wherein in the directly-connected high-voltage BESS, in each battery stack, DC ports of DC/DC converters in the plurality of battery branches are connected in parallel to a common bus capacitor, and the DC/DC converters in the plurality of battery branches together constitute a converter for the coordinated current control between the battery clusters.

14. The method according to claim 13, wherein in the directly-connected high-voltage BESS, the converter for the coordinated current control between the battery clusters comprises the common bus capacitor, M H-bridge circuits, and 2M filter inductors;
an $m^{th}$ H-bridge circuit in the H-bridge circuits comprises four switch transistors $S_{m1}$ to $S_{m4}$; and $S_{m1}$ and $S_{m2}$ form a first bridge arm of the $m^{th}$ H-bridge circuit, and $S_{m3}$ and $S_{m4}$ form a second bridge arm of the $m^{th}$ H-bridge circuit; and the first bridge arm and the second bridge arm of the $m^{th}$ H-bridge circuit are separately connected to the battery branch by using the filter inductor.

\* \* \* \* \*